No. 624,762. Patented May 9, 1899.
P. E. DOOLITTLE.
BACK PEDALING BRAKE.
(Application filed Apr. 24, 1897. Renewed Mar. 24, 1899.)

(No Model.) 2 Sheets—Sheet 1.

Witnesses
Jos. H. Blackwood
Albert B. Blackwood

Inventor
Perry E. Doolittle
by W. H. Doolittle & Son
Attorneys

THE NORRIS PETERS CO., PHOTO-LITHO., WASHINGTON, D. C.

No. 624,762. Patented May 9, 1899.
P. E. DOOLITTLE.
BACK PEDALING BRAKE.
(Application filed Apr. 24, 1897. Renewed Mar. 24, 1899.)
(No Model.) 2 Sheets—Sheet 2.
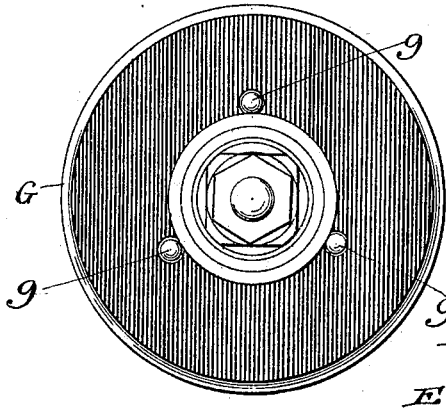
Fig. 4.
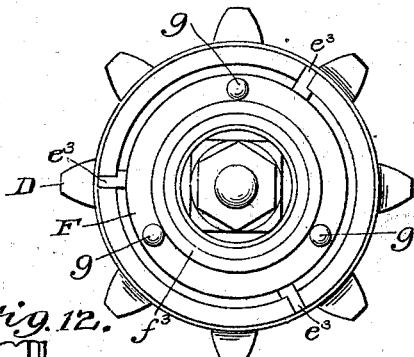
Fig. 5.
Fig. 12.
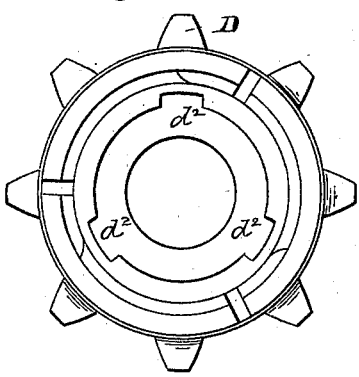
Fig. 6.
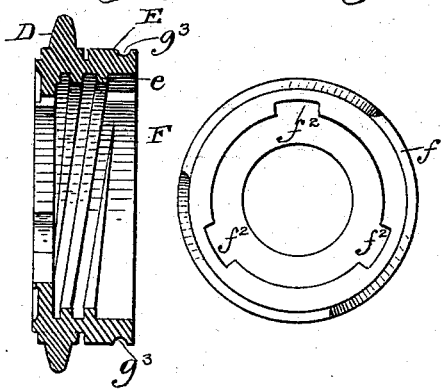
Fig. 7. Fig. 8.
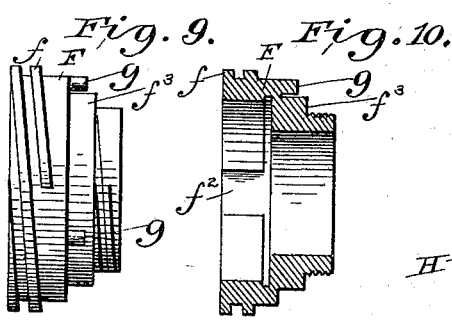
Fig. 9. Fig. 10.
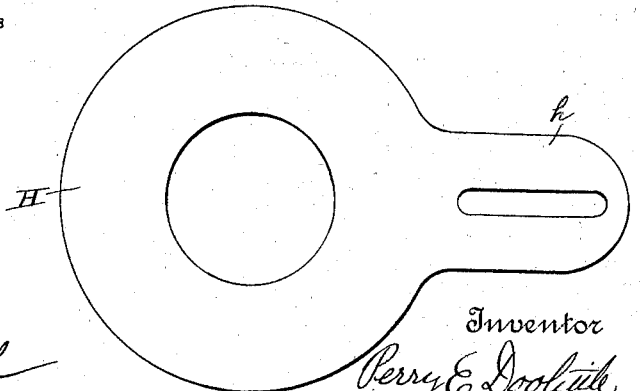
Fig. 11.
Witnesses
Jas. H. Blackwood
Albert B. Blackwood
Inventor
Perry E. Doolittle
by M. Doolittle & Son
Attorneys

UNITED STATES PATENT OFFICE.

PERRY E. DOOLITTLE, OF TORONTO, CANADA.

BACK-PEDALING BRAKE.

SPECIFICATION forming part of Letters Patent No. 624,762, dated May 9, 1899.

Application filed April 24, 1897. Renewed March 24, 1899. Serial No. 710,392. (No model.)

*To all whom it may concern:*

Be it known that I, PERRY E. DOOLITTLE, a subject of the Queen of Great Britain, residing at Toronto, in the county of York, Province of Ontario, and Dominion of Canada, have invented certain new and useful Improvements in Brake Mechanism for Bicycles; and I do hereby declare the following to be a full, clear, and exact description of the invention, such as will enable others skilled in the art to which it appertains to make and use the same.

My invention relates to brake mechanism for bicycles and similar vehicles, and more particularly to devices of the character set forth in my Patents Nos. 576,560, 576,561, and 576,562, in which is described an automatic brake operated by the reversing action of the driving means and provided with suitable means to prevent the undue operation of the brake and to fix the same in position when operated. In those patents the braking action is created by a contact device moving laterally and outwardly on its support against a fixed friction-surface, also on said support. In the patents referred to such support consists of the hub of the bicycle or other vehicle supporting the spokes and carrying the ball-bearings at its end.

In my present invention I have employed a series or a plurality of series of friction-disks, of which one disk is adapted to be moved against another disk or plate fixed to a part of the vehicle separate from the hub to clamp said fixed disk between the moving disk and a second friction-disk. The objects of such construction are to increase the power of the brake and to relieve all strain upon the ball-bearings caused by the contact of the frictional surfaces carried by the brake devices on the hub.

To accomplish these desired ends, my invention consists of the means hereinafter described and claimed.

My invention is illustrated in the accompanying drawings, in which—

Figure 1:
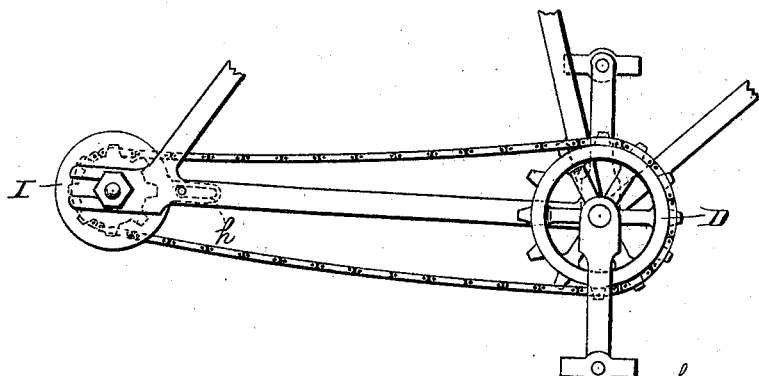
Figure 2:
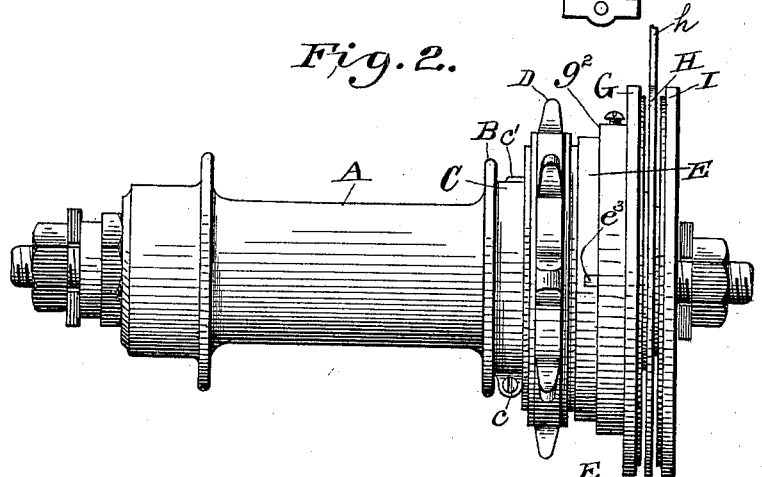
Figure 3:
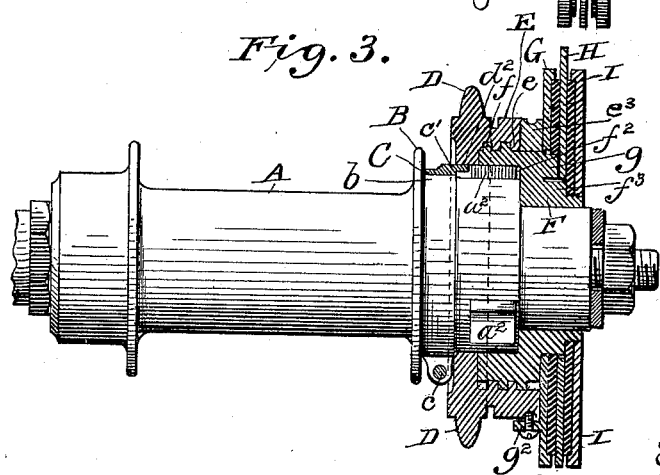

Figure 1 is a side view in elevation of a pedal-shaft, chain, and sprocket-wheel with my invention attached. Fig. 2 is a plan of the axle and hub of the driving-wheel with sprocket and brake mechanism. Fig. 3 is a vertical section of matters in Fig. 2, showing brake on. Fig. 4 is an end view without a friction-disk and fixed contact-plate removed. Fig. 5 is an end view with the inner friction-disk removed. Fig. 6 is an end view with moving disk-carrying sleeve removed. Fig. 7 is a sectional detail of sprocket-wheel. Fig. 8 is a rear face view of moving sleeve. Fig. 9 is a plan detail of moving sleeve; Fig. 10, a sectional detail of same part; Fig. 11, a detail of contact-plate. Fig. 12 is a detail of stop to limit relative movement of sleeve and sprocket.

Referring to the drawings, A is the hub of the rear driving-wheel of a bicycle, and B is the sprocket end of the hub, provided with a small raised collar or rim $b$. D is a sprocket-wheel on said hub so mounted as to have a slight rotary motion thereon. The sprocket end of the hub B is provided on its periphery with projections or lugs $a^2$ and the sprocket D with recesses $d^2$ on its inner circumference. When the sprocket is slid onto the hub, the projections $a^2$ of the latter enter the recesses $d^2$. The sprocket is then pushed beyond the lugs to its seat, so as to bring the recesses $d^2$ out of engagement with the lugs, whereby the sprocket is held against lateral movement on the hub by said lugs. Surrounding and adapted to bear on the rim $b$ is a metal circular band-clamp C, having its ends connected by an adjusting-screw $c$. A projection $c'$ of the band engages one of the recesses $d^2$ of the sprocket, so that the movement of the sprocket on the hub will be controlled by the pressure of the clamp on the hub. Such pressure may be regulated to any desired degree by means of the screw joining the ends of the band.

The sprocket D is provided on its outer side with a fixed collar E, which is provided interiorly with right-hand screw-threads $e$. Partly inclosed by and engaging this collar is a threaded sleeve F, the threads $f$ of which screw into the threads $e$. The sleeve is provided on its inner circumference with recesses $f^2$, which fit over and engage the lugs $a^2$ of the hub, so as to prevent the rotation of the sleeve on the hub. From the outer face of the threaded portion of the sleeve extend over a reduced middle portion $f^3$ pins $g$. The outer end of the sleeve is reduced and provided with left-hand screw-threads, for a purpose hereinafter described. In the outer edge of the collar E of the sprocket are notches or recesses, in which are placed plugs or stops $e^3$, adapted to bear against the ends of the screw-threads $f$ of the sleeve, and thus limit the forward motion of the sprocket on the hub.

G is a disk provided on its outer surface with leather, rubber, or other frictional material and having holes to engage the pins $g$, whereby the rotation and slipping of the disk are prevented when pressure is brought to bear on the same. The pins $g$ are, however, free to move laterally in the holes. The disk G is secured to the collar E of the sprocket by means of small screws passing through an annular rim $g^2$, overlapping the edge of the collar. The ends of these screws pass into a slight annular depression or groove $g^3$ in the collar near the edge thereof, thus preventing the lateral displacement of the disk, while at the same time permitting the collar to rotate within the rim of the disk.

Adjacent to friction-disk G and surrounding the hub is a metal contact-plate H, having an arm $h$, provided with a slot which engages a pin or other fastening means on the frame of the vehicle. The slot permits of the movement of the plate when the chain is adjusted. Another disk I, provided with an inner frictional surface, is screwed on the end of the sleeve F, being interiorly screw-threaded for that purpose.

The operation of the device is as follows: Normally the corresponding screw-threads of the collar and sleeve are in but slight engagement, the sleeve being at the extreme end of the hub. In the act of back-pedaling or reversing of the wheel to check its forward direction the power exerted on the sprocket tends to turn it slightly backward on the hub. The sprocket being fixed against lateral movement and the disk-carrying sleeve being fixed against rotary movement, this reverse action causes the engaging screw-threads of collar and of sleeve to draw the sleeve inward, which carries with it the outer friction-disk. The inner disk is secured to the sprocket-collar and remains stationary. Consequently on this movement of the outer disk the intermediate fixed disk, constituting the contact-plate, will be clamped between the two friction-disks and a braking action on the sprocket-wheel produced. This braking effect will be in proportion to the force of the reverse pressure exerted on the driving means.

The screw-threads on the outer end of the sleeve are made left handed in order that the outer disk may not be unscrewed by the pressure upon it when the brake is applied.

When the sprocket-wheel is in its normal position, the resistance of the friction-clamp against the hub prevents any accidental operation of the sprocket, due to slight and unintentional pressure upon the driving means, and holds the sprocket in this position until sufficient reverse pressure upon the driving means, caused by the exertion of considerable force, is brought to bear to overcome such resistance. The backward movement of the sprocket on the hub overcomes this resistance of the clamp, and the latter is turned back on the hub, with the sprocket. As soon as the backward pressure on the sprocket is relieved the pressure of the clamp upon the hub is such as to still hold the sprocket-wheel turned back and the friction-disks against the contact-plate until released by sufficient impelling force exerted in a forward direction on the driving means, which carries the sprocket beyond the holding force of the band-clamp.

More than two friction-disks with an intermediate contact-plate may be employed, if so desired, although in a bicycle the number shown affords sufficient braking power and is a preferable construction; but in the application of the brake to other vehicles, particularly motor-carriages, where greater power is desired, several series of these braking-disks may be employed, as is illustrated in my pending application, Serial No. 642,096.

In this application I have specified and illustrated a brake for bicycles and similar vehicles, consisting, essentially, of two rotating disks mounted on a support and arranged absolutely non-rotatable to each other, with one disk having a lateral motion at right angles to the plane of rotation and so arranged as to clamp between them a fixed friction plate or disk to produce the desired braking effect. As in my arrangement the revolving disks are absolutely non-rotatable one to the other, and as the pressure which compresses them against the fixed disk is supplied from the outside, therefore the braking effect produced must always be the amount of friction set up on the opposing surfaces by the amount of pressure to which they are subjected by the operating means. Thus in my brake friction force produced on the plates can in no possible way affect the pressure with which they are forced together, so that the brake is absolutely dependent for its power on the force with which the sprocket-wheel is reversed. As this pressure is entirely under the control of the rider, the brake is operative through all degrees from the very slightest to the most powerful application.

My invention is not limited to the specific form of locking means, as shown, for preventing the undesired operation of the brake and for locking it when operated. Other devices to accomplish the same result may be employed—for instance, the constructions shown in my Patents Nos. 576,560 and 576,561. Various other details of construction may be varied, as the means for limiting the movement of the sprocket-wheel and for preventing rotation of the disks, without departing from the principle of my invention.

Having thus described my invention, what I claim is—

1. In a brake mechanism for bicycles and similar vehicles, in combination with the driving-wheel and driving means, the sprocket or other gear wheel on the hub of said wheel, a sleeve on the sprocket end of said hub and engaging said sprocket, a disk secured to said sleeve and a disk secured to said sprocket, a contact-plate between said disks and means to clamp said disks and plate together by the backward movement of said sprocket, substantially as described.

2. In a bicycle or similar vehicle, in combination with the driving-wheel and driving means, a brake mechanism mounted on the sprocket end of the hub of said wheel, said brake mechanism consisting of a sprocket or other gear wheel having a limited rotary movement on the hub, a friction-disk secured to said sprocket, a laterally-movable friction-disk on the hub, a contact-plate between said disks, and means to clamp said plate between said disks or release it therefrom by the rotary movement of the sprocket, substantially as described.

3. In a brake mechanism for bicycles and similar vehicles, in combination with the driving means, a driven disk connected with the said driving means and mounted on a suitable support, a friction-disk secured to the driven disk, a disk fixed to the frame of the vehicle and loosely surrounding said support, said driven disk having a rotary movement relative to its support, a sleeve having a lateral movement on the support and controlled in said movement by the rotary disk, a friction-disk secured to said sleeve, and means to move said sleeve and its disk inwardly on the backward movement of the sprocket, whereby said friction-disk is forced against said fixed disk, substantially as described.

4. In a brake mechanism for bicycles and similar vehicles, in combination with the driving means and driven disk and a support for said disk, said disk having a rotary movement on its support, a collar on said disk provided with interior screw-threads, a threaded sleeve on said support engaging said collar, a friction-disk on said support secured to the driven disk, a second friction-disk secured to the outer end of said sleeve, a contact-plate between said friction-disks and fixed to the frame of the vehicle, and means to prevent the lateral movement of said driven disk and the rotation of the sleeve, whereby on the reverse action of the driving means, said sleeve and its disk will be carried inward against the contact-plate and clamp the same between the friction-disks, substantially as described.

5. In a brake mechanism for bicycles and similar vehicles, driving means, two frictional brake members mounted on a rotating support and relatively non-rotative, in combination with an intermediate contact-plate fixed to the frame of the vehicle, and means to clamp said rotating brake members against the fixed plate by the backward action of the driving means, substantially as described.

In testimony whereof I affix my signature in presence of two witnesses.

PERRY E. DOOLITTLE.

Witnesses:
THOMAS EWING, Jr.,
W. G. DOOLITTLE.